Patented May 5, 1953

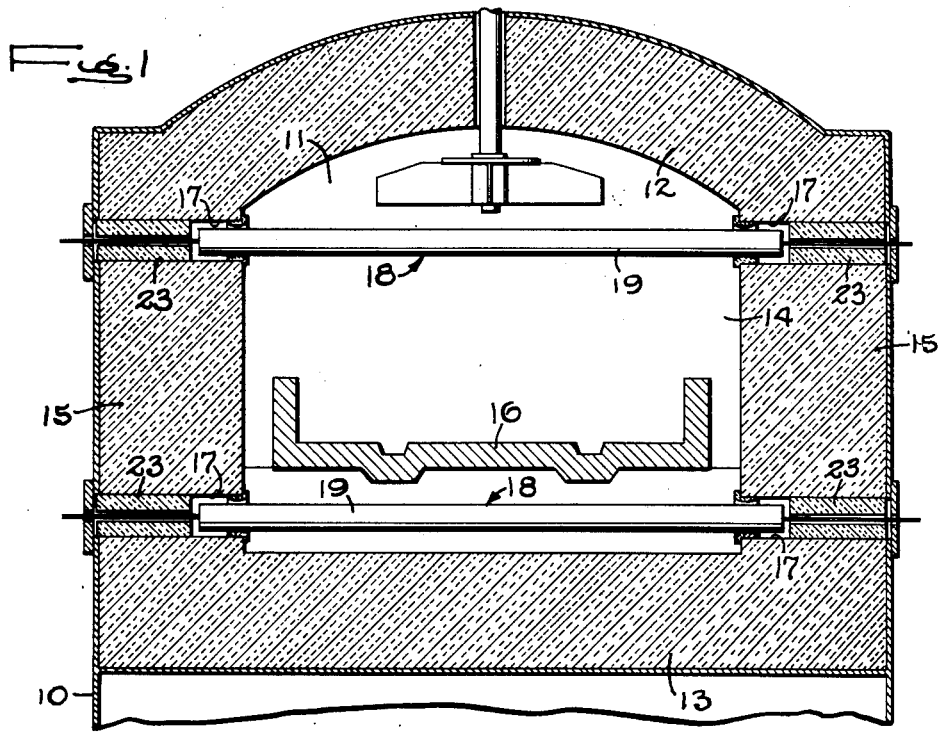
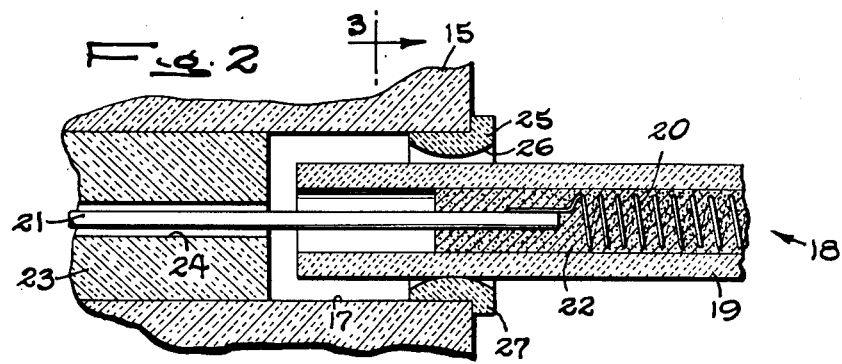
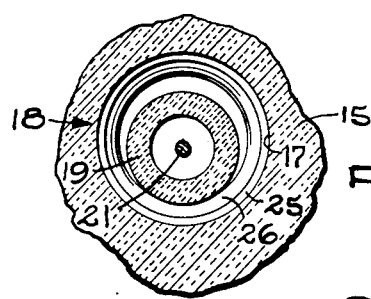

2,637,755

UNITED STATES PATENT OFFICE 2,637,755

ELECTRIC HEATING APPARATUS

Harold N. Ipsen, Rockford, Ill.

Application February 16, 1950, Serial No. 144,399

4 Claims. (Cl. 13—25)

This invention relates to electric furnaces for heat treating metal parts and the primary object is to provide a furnace and an electric heater therefor which are constructed and arranged in a novel manner with respect to each other to minimize heating of the walls of the furnace and the transmission of heat through the same.

Another object is to form the heater as a tube of ceramic material which encloses a high resistance electric heating element and which is mounted on the furnace walls in a novel manner to minimize the length of the tube and the stresses thereon during thermal expansion and contraction of the tube and the walls whereby to prevent breakage of the tube.

Other objects and advantages of the invention will become apparent from the following detailed description taken in connection with the accompanying drawings, in which Figure 1 is a fragmentary vertical section of heat treating apparatus involving the novel features of the present invention.

Fig. 2 is a fragmentary enlargement of a part of Fig. 1.

Fig. 3 is a section taken along the line 3—3 of Fig. 2.

In the drawings, the invention is shown for purposes of illustration in a furnace mounted on a frame 10 and having a heating chamber 11 defined by top and bottom walls 12 and 13, end walls 14, and spaced upright side walls 15. A platform or floor 16 supported on the side walls and spaced above the bottom wall supports workpieces (not shown) to be heated within the chamber. Spanning the side walls and extending at opposite ends into alined holes 17 therein at points spaced along the chamber are one or more electric heaters 18 in the form of tubes 19 of refractory material which enclose heating elements 20. Herein, the latter are coils of high resistance wire such as Nichrome each connected at opposite ends to lead wires 21 and embedded in a non-metallic refractory material 22 such as powdered magnesium oxide which is an electric insulator and has relatively high heat conductivity. The alined holes in this instance are circular in cross-section.

In accordance with the present invention, the heaters 18 are constructed and supported in the alined holes 17 in a novel manner to minimize heating of the side walls 15 of the furnace or the transmission of heat therethrough and to reduce breakage of the tubes 19. For this purpose, each tube is made substantially smaller in diameter than the holes and slightly longer than the spacing between the side walls so as to extend into the alined holes but short of the outer ends thereof and rest at opposite ends on the defining surfaces of the holes. Also, the heating coil 20 extends short of the ends of the tube and the chamber walls so as to be disposed entirely within the chamber and heat only an intermediate portion of the tube. The lead wires 21 extend outwardly from the chamber through the holes and are composed of heavy Nichrome wire or the like having lower electrical resistance so that little heat is generated within the holes or the end portions of the tubes. With each heater constructed and arranged in the holes 17 in this manner, the end portions of the tube are heated only indirectly by the high resistance heating coil 20 and, therefore, are of a lower temperature than the intermediate portion of the tube so as to minimize heating of the furnace walls.

To prevent the escape of heat from the chamber through each hole 17, the latter is reduced in size adjacent its outer end to receive only the lead wire 21 projecting from the end of the heater 18 resting on the inner end of the hole. In this instance, such reduction of the size of each hole is effected by an insulating plug 23 of suitable refractory material pressed into the hole and apertured as at 24 to receive the lead wire 21. The aperture 24 is slightly larger in diameter than the lead wire to prevent the passage of heat through the aperture while permitting the wire to move freely therein during axial expansion and contraction of the tube.

Extending at least partially around the periphery of each of the holes 17 on the inner end thereof is a support 25 preferably of a non-metallic heat-resistant material which is formed with a curved surface 26 thereon facing inwardly from the defining surfaces of the hole to engage the outer periphery of the tube end extending into the hole. In the present instance, the supports are in the form of rings pressed into the inner ends of the holes and having flanges 27 on their inner ends engaging the inner sides of the side walls 15 around the holes. By locating the rings at the inner ends of the holes and curving the tube engaging surfaces 26 on the rings, the span of each tube is small resulting in correspondingly small lateral stresses therein. Also, each tube may expand and contract freely with none of the expansion and contraction stresses in the furnace walls being transmitted to the tube. Thus, danger of breakage of the tubes is minimized.

It will be apparent that when an electric current is passed through one of the heaters 18 constructed and mounted as above described, only the intermediate portion thereof will be heated directly by the heating coil 20, the ends of the tube, and therefore the side walls 15, remaining relatively cool since the lead wire 21 has a low resistance and because the heating coil extends short of the tube ends. Since the tube extends short of the outer ends of the holes and the latter are sealed by the plugs 23, heat is prevented from escaping outwardly through the holes 17 from the chamber 11. Also, the tube is free to expand and contract freely relative to the furnace walls without danger of breakage owing to the size of the holes and the presence of the support rings 25.

I claim as my invention:

1. Heat treating apparatus having, in combination, means defining a chamber to be heated and including laterally spaced upright walls having alined holes extending therethrough, apertured insulating plugs pressed into said holes on the outer ends thereof, supports of non-metallic heat-resistant material extending at least partially around the peripheries of said holes on the inner ends thereof and having curved surfaces thereon facing inwardly from the defining surfaces of the holes, a tube of refractory heat-resistant material substantially smaller in external dimension than said holes, said tube spanning said walls and extending into said holes short of said plugs to rest adjacent opposite ends on said curved support surfaces whereby to permit free expansion and contraction of the tube, a non-metallic refractory powder filling a portion of said tube intermediate the ends thereof, and an electrical resistance heating element embedded in said powder with the end portions extending slidably out through the apertures in said plugs and providing terminals disposed outside of said chamber.

2. Heat treating apparatus having, in combination, means defining a chamber to be heated and including laterally spaced upright walls, means on said walls defining alined holes extending therethrough, apertured insulating plugs pressed into said holes on the outer ends thereof, a tube of refractory heat-resistant material smaller in external dimension than said holes, said tube spanning said walls and extending into said holes short of said plugs to rest slidably on the defining surfaces of the holes and permit free expansion and contraction of the tube during heating and cooling thereof, a non-metallic refractory powder filling a portion of said tube intermediate the ends thereof, an electrical resistance heating element embedded in said powder and extending along said tube short of the ends thereof and short of said chamber walls, and electrical conductors of low resistance connected to opposite ends of said resistance element and extending from points within said tube and said chamber slidably through the apertures in said plugs.

3. Heat treating apparatus having, in combination, means defining a chamber to be heated and including laterally spaced upright walls, means on said walls defining alined holes extending therethrough, a tube of refractory heat-resistant material smaller in external dimension than said holes, said tube spanning said walls and extending into said holes short of the outer ends thereof to rest slidably on the defining surfaces of the holes and permit free expansion and contraction of the tube during heating and cooling of the same, a non-metallic refractory powder filling said tube between said chamber walls, and electrical resistance heating element embedded in said powder and extending along said tube short of the ends thereof and short of said chamber walls, and conductors of low electrical resistance connected to opposite ends of said resistance element and extending from points within said tube and said chamber through said holes to provide terminals disposed outside of said chamber, the outer ends of said holes being reduced in size to receive said conductors slidably and prevent the escape of heat from the chamber through the holes.

4. Heat treating apparatus having, in combination, means defining a chamber to be heated and including laterally spaced upright walls, means on said walls defining alined holes opening inwardly into said chamber, means contacting and fixed to said walls and closing the outer ends of said holes, a tube of refractory heat-resistant material of a size substantially smaller in external dimension than said holes and spanning said walls with the ends thereof projecting into and supported within said holes, at least one of said ends extending into its associated hole short of the closing means and resting loosely on the defining surface of said hole to permit free longitudinal expansion and contraction of the tube by movement of said one tube end toward and away from said closing means, an electrical resistance heating element disposed within said tube intermediate the ends thereof, said closing means having an aperture substantially smaller in size than said tube, and a lead wire extending through said aperture and connected to said resistance heating element.

HAROLD N. IPSEN.

References Cited in the file of this patent
UNITED STATES PATENTS

| Number | Name | Date |
|---|---|---|
| Re. 18,420 | Shaw | Apr. 12, 1932 |
| 1,367,341 | Abbott | Feb. 1, 1921 |
| 1,555,292 | Keene | Sept. 29, 1925 |
| 1,903,036 | Francis | Mar. 28, 1933 |
| 2,491,579 | Poland | Dec. 20, 1949 |